Figure 1A:
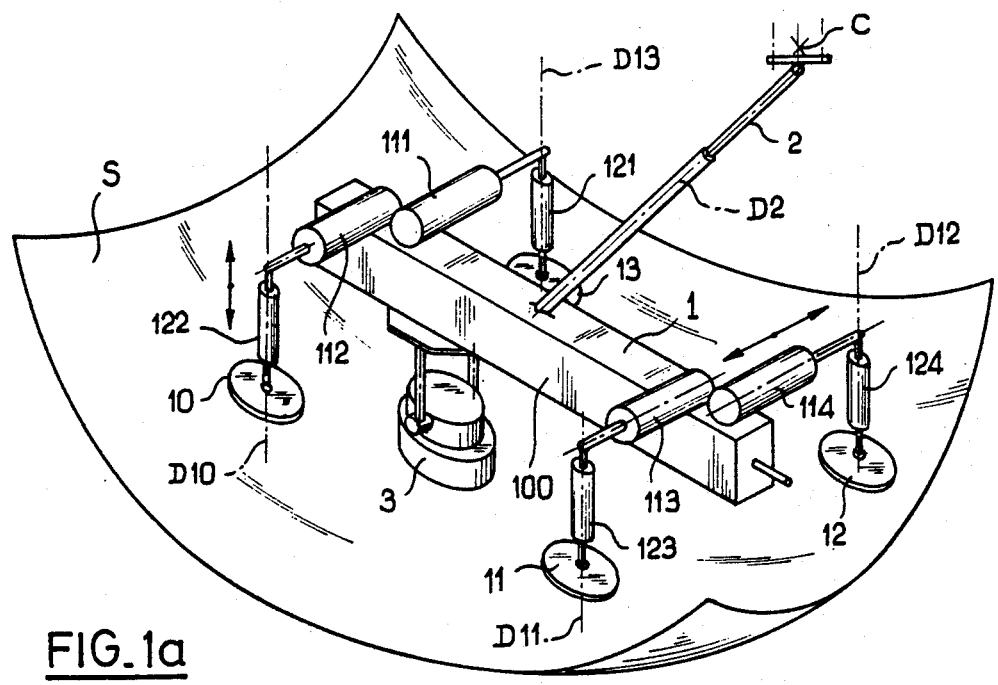

United States Patent [19]

Gemma

[11] Patent Number: 4,883,576
[45] Date of Patent: Nov. 28, 1989

[54] APPARATUS FOR SURVEY AND/OR TREATMENT OF A SMOOTH, CURVED SURFACE

[75] Inventor: Antoine Gemma, Meudon, France

[73] Assignee: Electricite De France (Service National), Paris, France

[21] Appl. No.: 126,859

[22] Filed: Nov. 30, 1987

[30] Foreign Application Priority Data

Dec. 1, 1986 [FR] France ................................ 86 16725

[51] Int. Cl.$^4$ .......................... C25D 17/00; C25F 7/00; B60T 7/16; B60S 9/02
[52] U.S. Cl. .............................. 204/224 M; 204/225; 204/275; 180/168; 280/765.1
[58] Field of Search .............. 204/212, 224 R, 224 M, 204/271, 225, 277, 275; 180/167, 168; 280/763.1, 764.1, 765.1

[56] References Cited

U.S. PATENT DOCUMENTS

| | | | |
|---|---|---|---|
| 3,772,163 | 11/1973 | Jumer | 204/212 X |
| 3,857,764 | 12/1974 | Jumper | 204/212 X |
| 3,909,388 | 9/1975 | Faust et al. | 204/224 M |
| 4,101,405 | 7/1978 | Inoue | 204/224 M X |
| 4,190,513 | 2/1980 | Jumer | 204/224 R |
| 4,353,785 | 10/1982 | Inoue | 204/225 X |
| 4,609,450 | 9/1986 | Seimiya et al. | 204/224 M |
| 4,634,511 | 1/1987 | Operschall et al. | 204/212 |

FOREIGN PATENT DOCUMENTS

| | | |
|---|---|---|
| 0007557 | 2/1980 | European Pat. Off. . |
| 0112576 | 7/1984 | European Pat. Off. . |
| 0186488 | 7/1986 | European Pat. Off. . |
| 2242750 | 3/1975 | France . |

Primary Examiner—Donald R. Valentine
Attorney, Agent, or Firm—Blakely, Sokoloff, Taylor & Zafman

[57] ABSTRACT

The invention relates to an apparatus for survey and/or treatment of a smooth curved surface.

The apparatus comprises a vehicle able to be moved on the surface along a predetermined path, the vehicle being provided with abutment means movable with respect to the body of the vehicle. A support arm of the vehicle is fixed to this by a swivel pivot point. The support arm is fixed close to the center of curvature of the curved surface. The axes of the abutment means and of the arm of two supports can be oriented to be substantially concurrent in the vicinity of the center of curvature of the curved surface. Means for survey and-/or treatment of the curved surfaces are fixed to the vehicle. Means for control of driving of the vehicle and of the survey and/or treatment means are also provided.

Application to the survey and to the maintenance of water boxes of steam generators of electo-nuclear power stations.

18 Claims, 11 Drawing Sheets

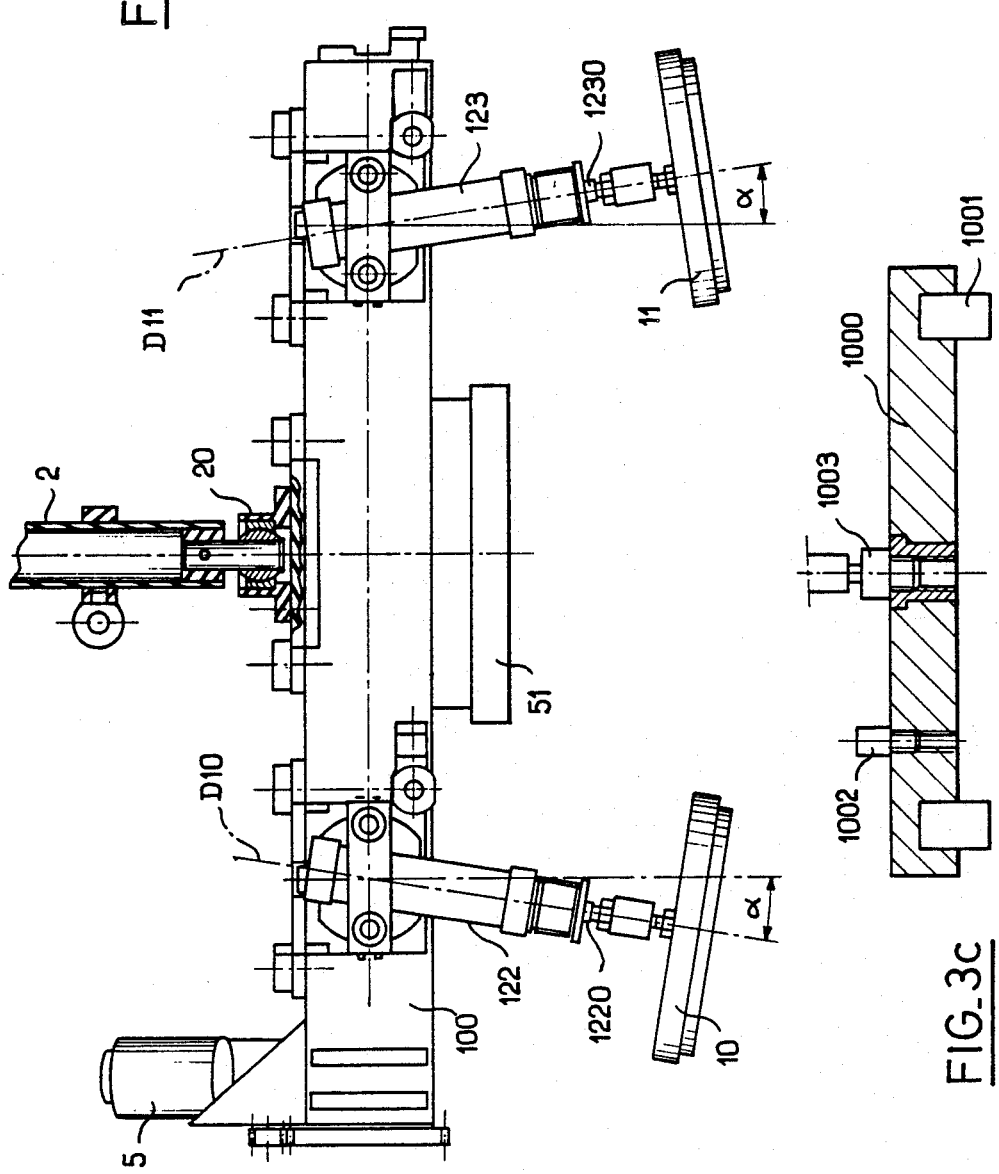

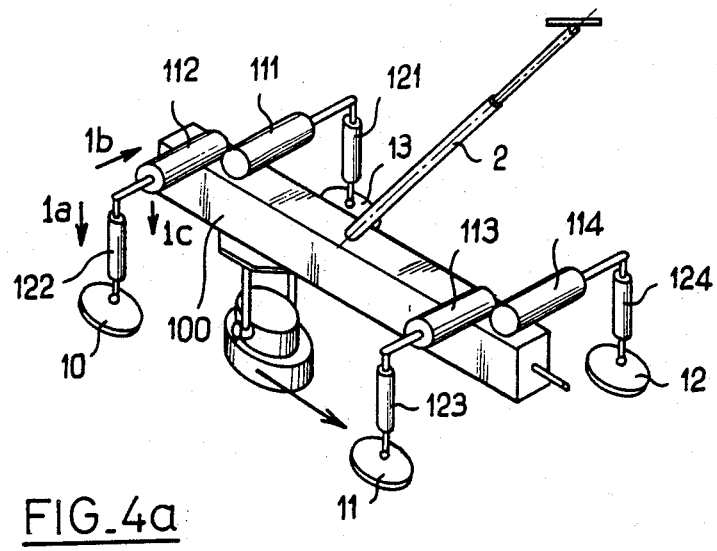
FIG_4a
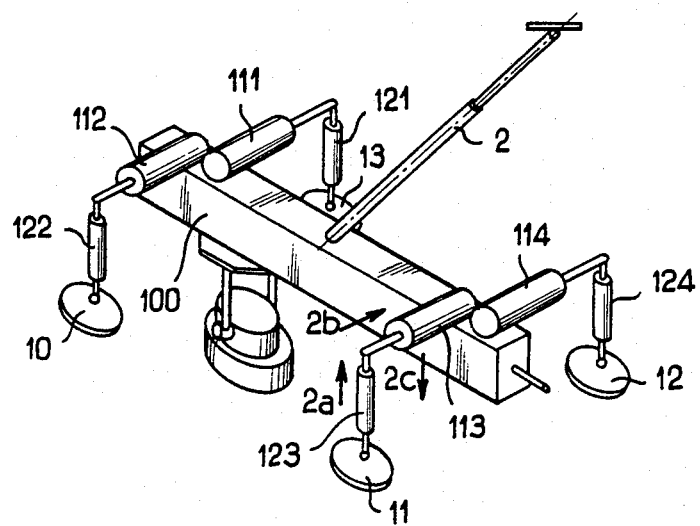
FIG_4b

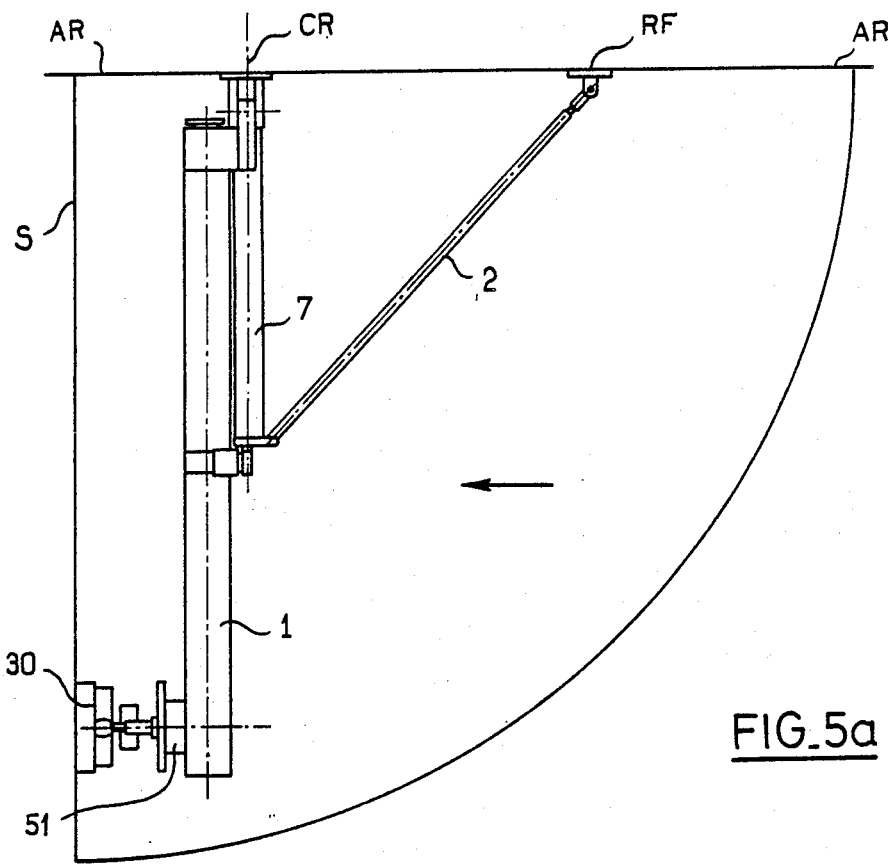
FIG_5a
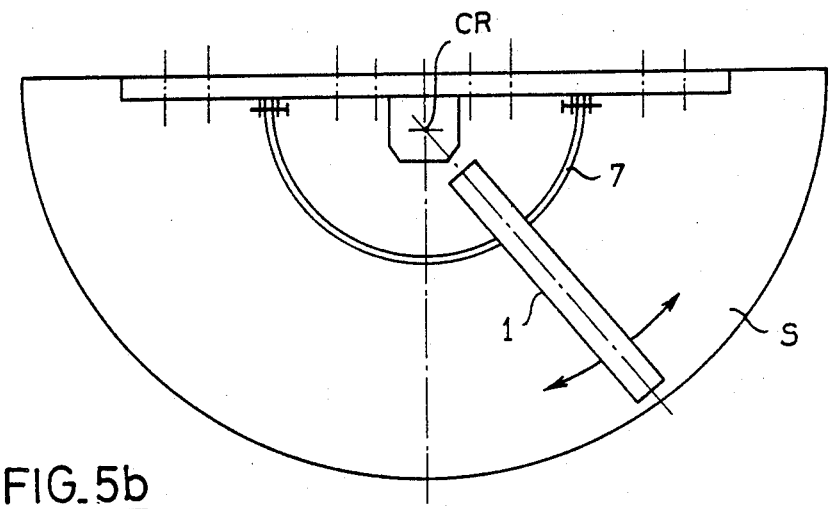
FIG_5b

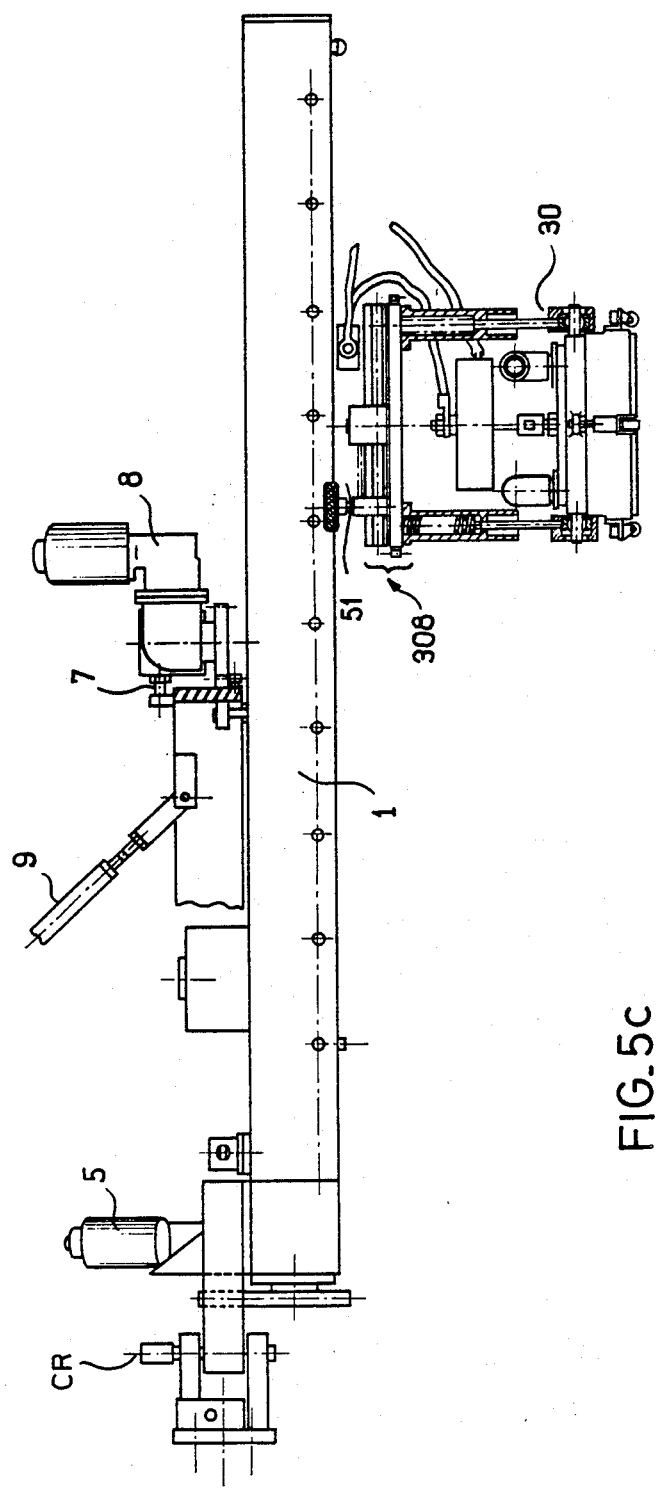
FIG._5c

APPARATUS FOR SURVEY AND/OR TREATMENT OF A SMOOTH, CURVED SURFACE

FIELD OF THE INVENTION

The present invention relates to apparatus for survey and/or treatment of a smooth curved surface.

BACKGROUND OF THE INVENTION

Apparatuses permitting survey and treatment of a surface, or predetermined zones of this surface, are of increasing interest in the field of survey and maintenance of steam generators of nuclear power stations, particularly for inspection of steam generator tubes.

In a general manner, a vehicle provided with progression means of the caterpillar type allows displacement of a probe-carrying tool in front of the openings of the tubes of the steam generator, the caterpillar having for example spigots able to be engaged in the mentioned orifices in order to ensure progression of the assembly constituted by the vehicle and the probe-carrying tool. Such apparatus has been described particularly in French Patent Application No. 2 471 026 published on 12th June 1981.

Although such systems give satisfaction for the survey and/or maintenance of surfaces provided with openings arranged at a very regular pitch, the pitch of the spigots of the caterpillar being correspondingly arranged, they cannot be used in the case of smooth surfaces and particularly curved surfaces.

In the technical field of survey and/or maintenance of steam generators for nuclear power stations, it is necessary to provide systems for survey and/or treatment of both curved and flat smooth surfaces. In particular, it is indispensable, preliminarily to the bringing into service of the nuclear reactor, to carry out electrochemical polishing of the internal walls of the water box of the steam generator, which essentially consist of curved, spherical or flat smooth surfaces.

This polishing is necessary in order to reduce the susceptibility to contamination of these walls by fixing, in the absence of polish, of radioactive erosion products such as contaminating oxides coming from the central part of the reactor and carried by the steam generator water and thus to reduce the risks of exposure to these contaminating products of maintenance staff brought in to carry out systematic periodic maintenance. This polishing can also be carried out either in a preventative manner, as previously described, or in a curative manner, after a number of hours of functioning of the reactor.

THE INVENTION

The invention has the object of remedying the limitations of the prior art apparatus by providing apparatus for survey and/or treatment of a smooth surface able to be used either in the case of a curved surface, or in the case of a surface with a large or very large radius of curvature, or a substantially flat surface.

Another object of the present invention is to provide apparatus for survey and/or treatment of a smooth surface under substantially automatic control from outside the water box of the steam generator.

Another object of the present invention is to provide apparatus for survey and/or treatment of a smooth surface with very high reliability and with very high functional safety.

The apparatus for survey and/or treatment of a smooth curved surface according to the invention is remarkable in that it comprises a vehicle able to be moved on this surface along to a predetermined path, this vehicle being provided with abutment means, onto this surface, movable with respect to the body of the vehicle, a support arm of the vehicle and fixed to this at one of its ends, the support arm being at its other end rotarily pivoted in the vicinity of the centre of curvature of the curved surface, the axes of the abutment means and of the support arm being able to be oriented substantially concurrent in the vicinity of the centre of curvature of the curved surface, means for survey and/or treatment of the said curved surface fixed to the vehicle and means for control and driving of the said vehicle and of the survey and/or treatment means.

The invention finds application in the survey and/or maintenance of steam generators of nuclear reactors or in any technical field in which the displacement of a vehicle on a smooth, particularly curved, surface, has to be carried out.

THE DRAWINGS

Figure 1B:
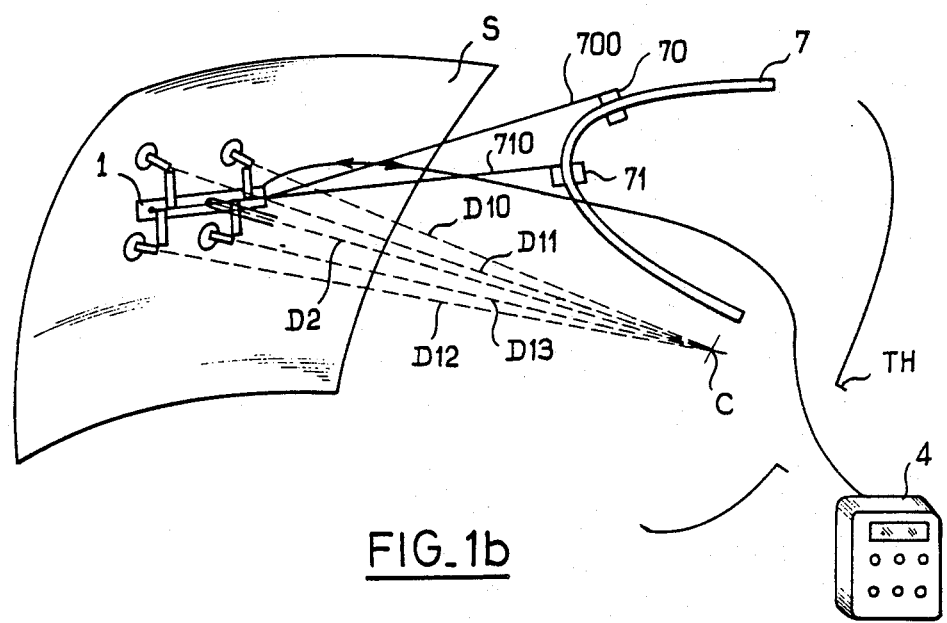
Figure 2A:
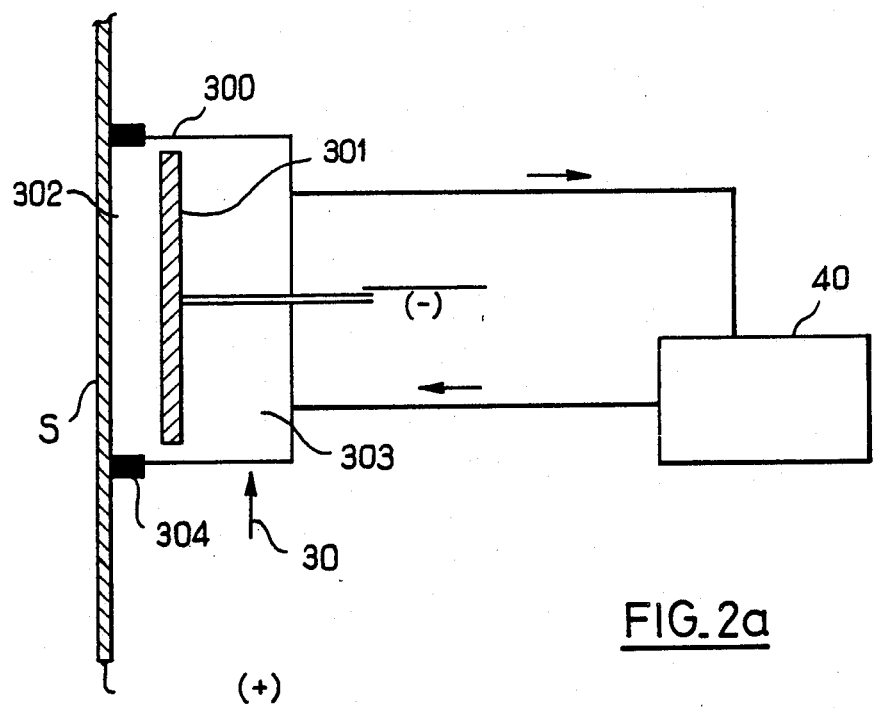
Figure 2B:
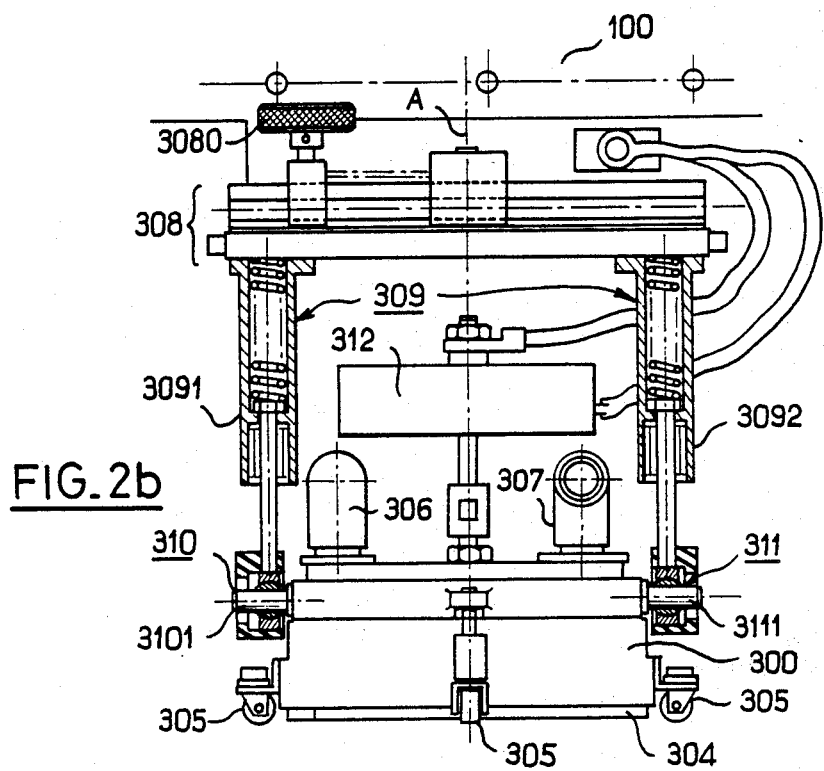
Figure 3A:
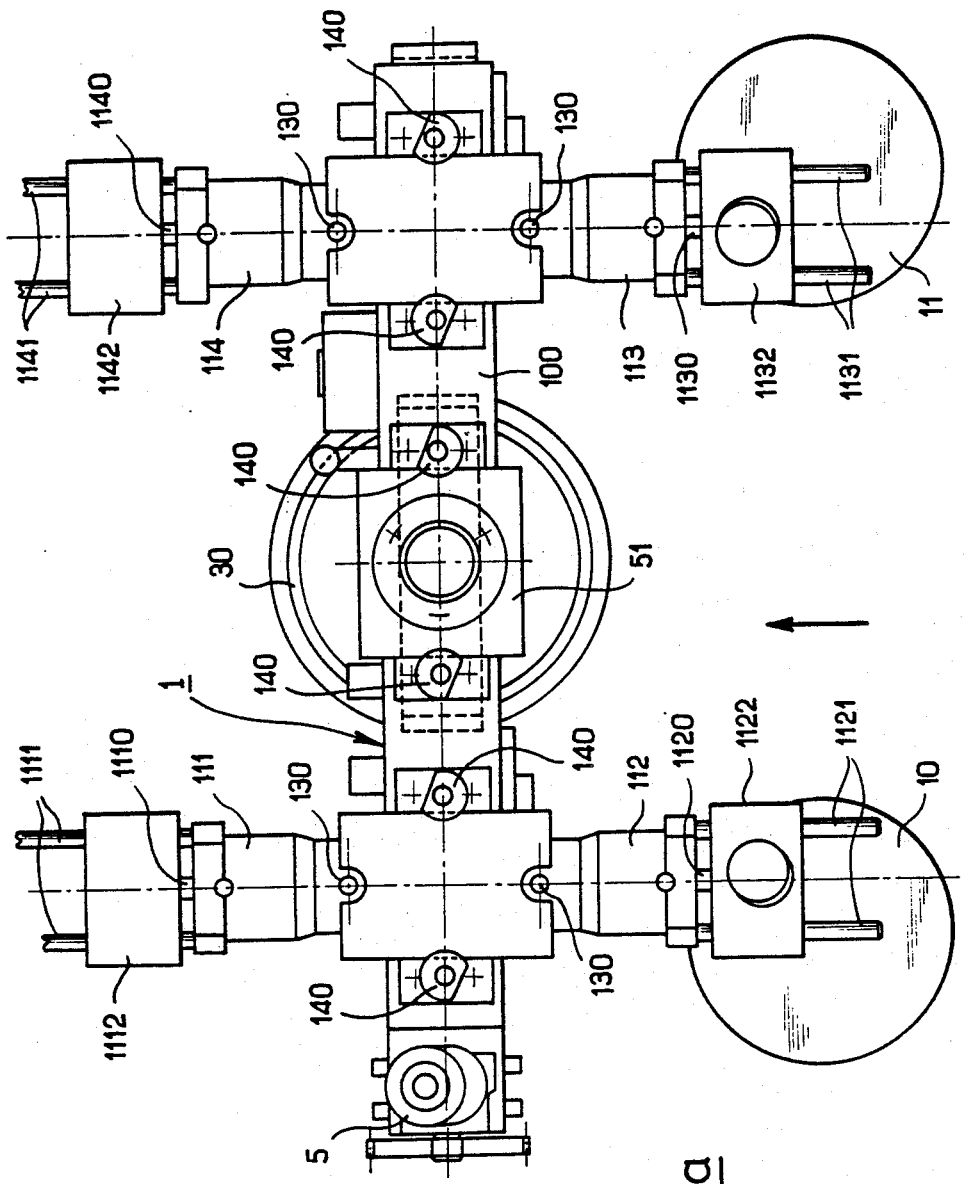
Figure 4C:
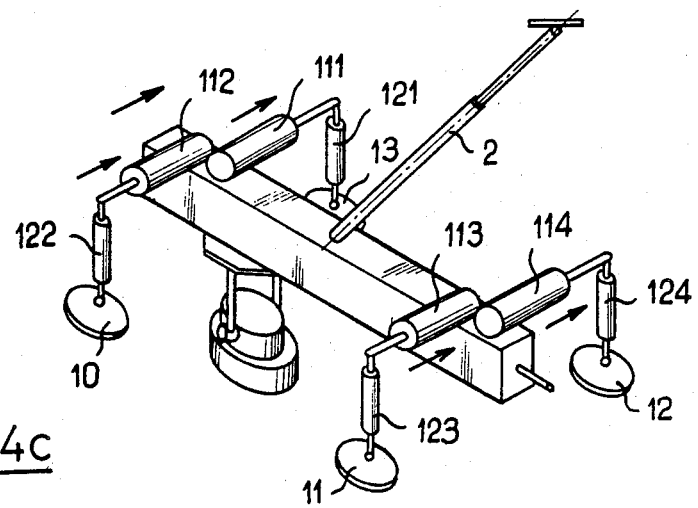
Figure 4D:
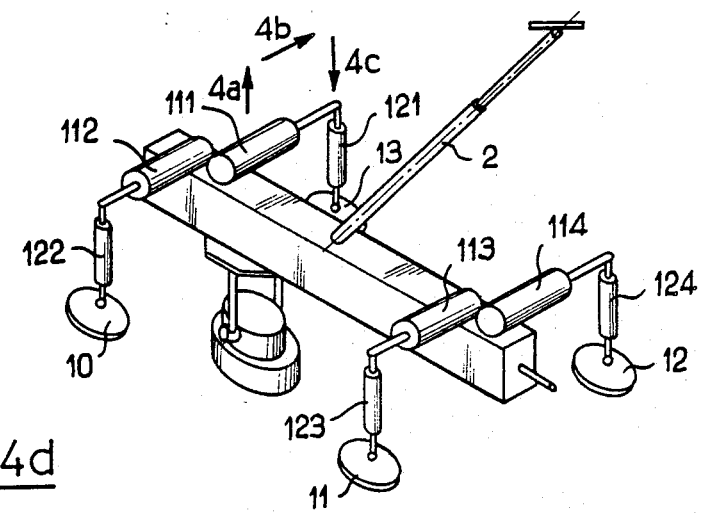
Figure 4E:
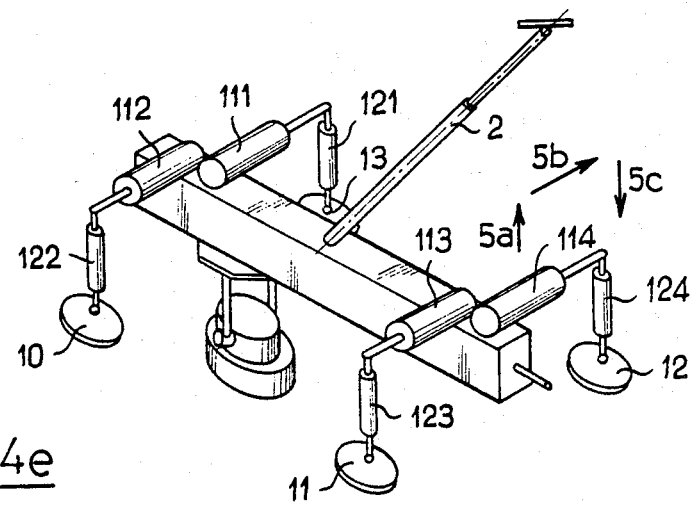
Figure 5D:
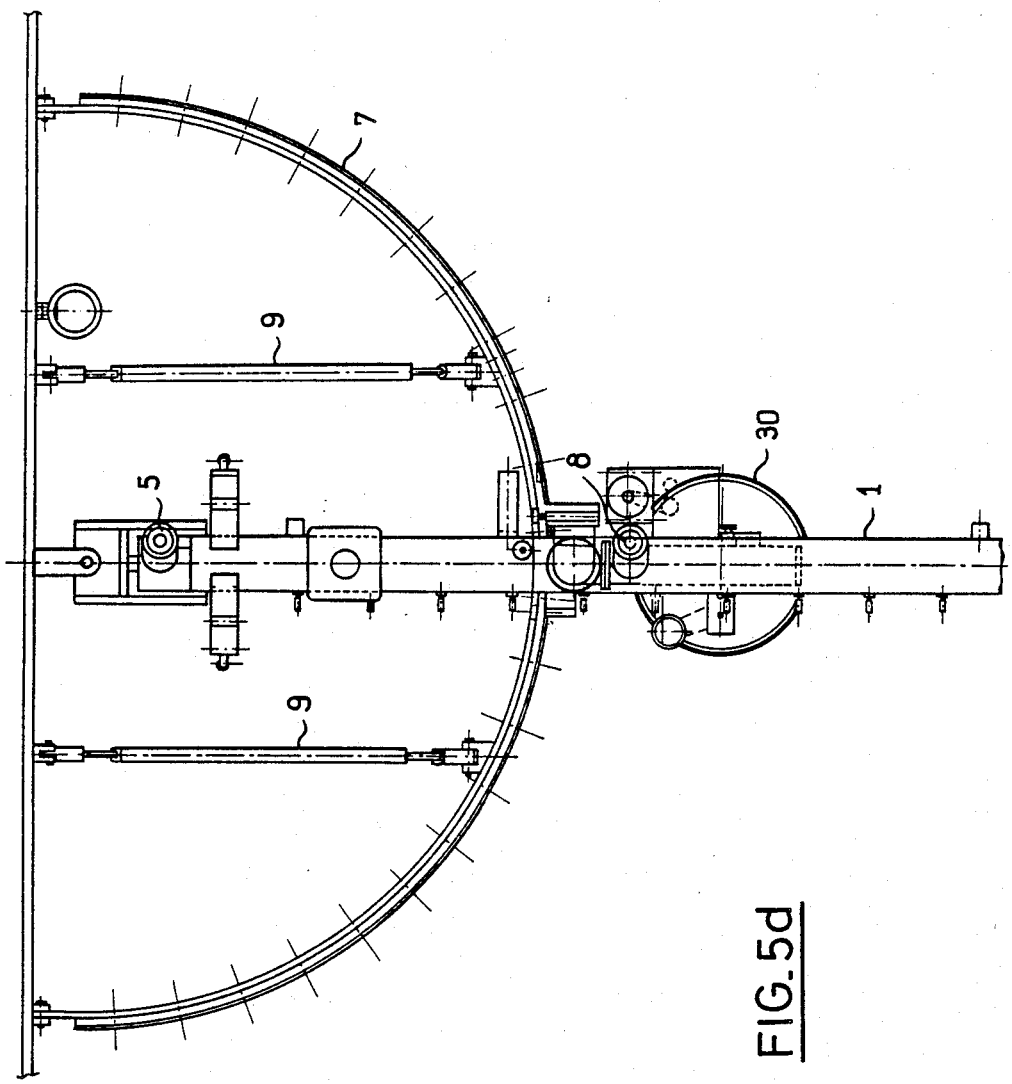
Figure 6A:
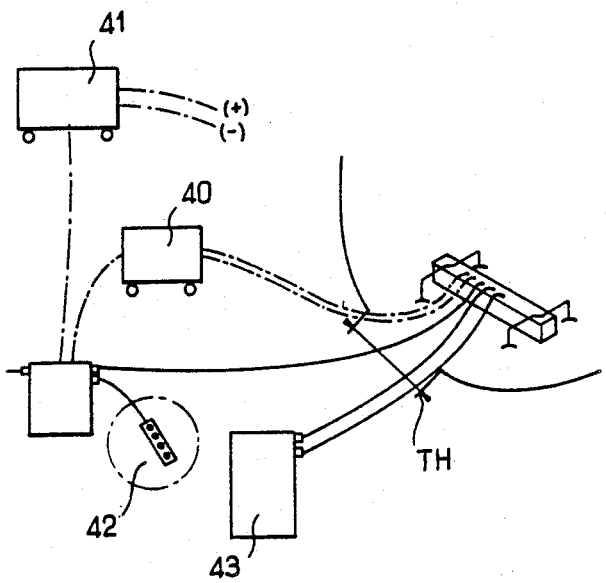
Figure 6B:
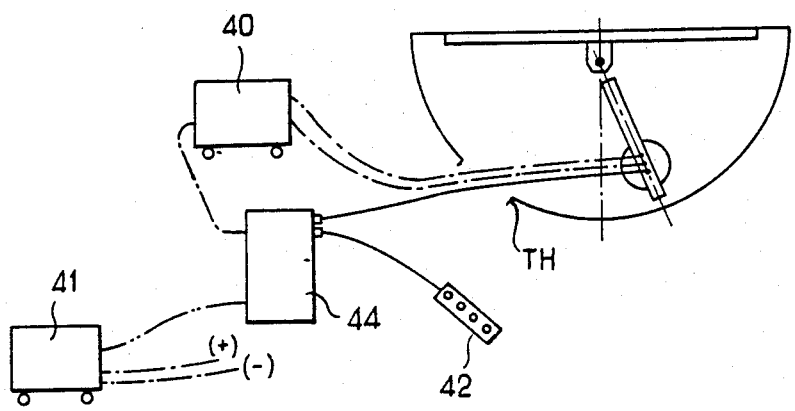
Figure 6C:
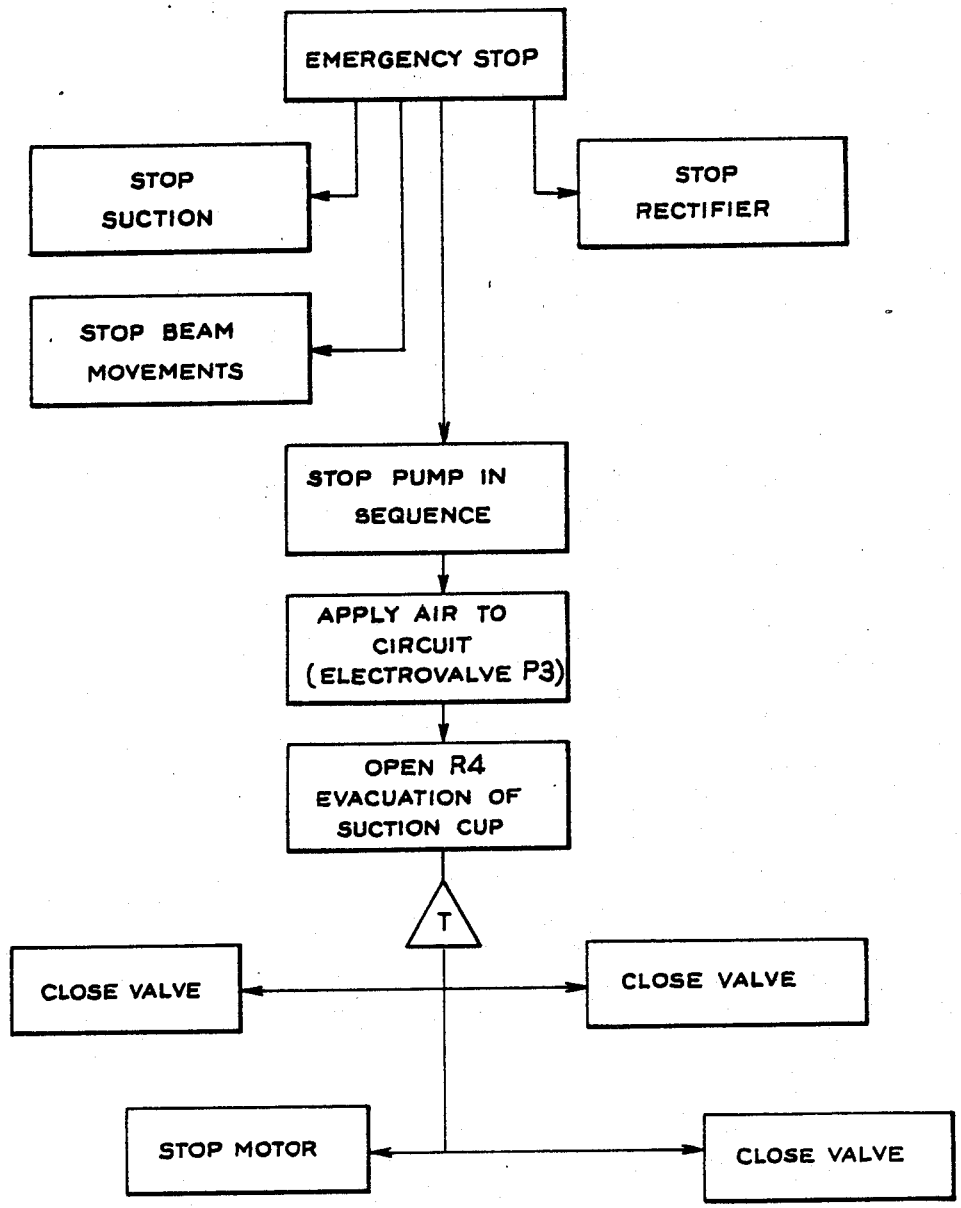

The invention will be better understood from reading the description and studying the following drawings, in which:

FIGS. 1a and 1b show a perspective view of a first non-limitative embodiment of apparatus for survey and/or treatment of a smooth curved surface according to the invention, FIGS. 2a and 2b show respectively a general diagram and a detailed cross-sectional view of an active element associated with the vehicle, this active element being constituted by an electropolishing cell, FIGS. 3a and 3b show, in partial cross-section, as regards FIG. 3b, a plan view of an advantageous embodiment of the vehicle of the apparatus shown in FIGS. 1a and 1b and a side view of FIG. 3a in accordance with the arrow shown in this Figure, FIG. 3c shows, in diametral cross-section, a view of a support suction cup of the vehicle such as shown in FIGS. 3a and 3b, FIGS. 4a to 4e show an example of sequential functioning of the different elements of the vehicle shown in FIGS. 3a and 3b on displacement control for this, FIGS. 5a and 5b show respectively, in the particular case of large or very large radius of curvature, another embodiment of the vehicle of apparatus of the invention and a right side view of FIG. 5a on the arrow shown in the said Figure, FIGS. 5c and 5d show a more detailed assembly view of FIGS. 5a and 5b, FIGS. 6a and 6b show a synoptic diagram of the installation necessary for operation respectively of the first and of the second embodiment of the apparatus for survey and/or treatment of a smooth curved surface according to the invention, FIG. 6c shows a synoptic diagram of an emergency stop of the installation shown in FIG. 6a or 6b.

In all the drawings, the same references indicate the same elements.

FIRST EMBODIMENT

The apparatus for survey and/or treatment of a smooth curved surface according to the invention will now be described in connection with FIGS. 1a and 1b, which show a detailed perspective view and a more general view of the apparatus according to the invention, in a first embodiment.

In accordance with FIG. 1a, the apparatus for survey and/or treatment of a smooth curved surface, designated S in the said Figure, comprises a vehicle designated 1 able to be moved on this surface S, along a predetermined path. The vehicle 1 is provided with means for abutment 10,11,12,13 onto this surface S, these abutment means being movable with respect to the body of the vehicle 1.

A support arm 2 of the vehicle is fixed to this at one of its ends, the arm 2 being at its other end rotarily pivoted in the vicinity of the centre of curvature designated C of the smooth curved surface S. Thus as shown in FIG. 1a and in FIG. 1b particularly, axes designated D10,D11,D12,D13 of the abutment means and of the support arm 2, axis designated D2, are able to be oriented substantially concurrent in the vicinity of the centre of curvature C of the curved surface S.

Means 3 for survey and/or treatment of the smooth curved surface S are fixed to the vehicle 1. Means for control and driving of the vehicle 1, means designated 4, permitting also control of the survey and/or treatment means 3 previously mentioned, are also provided. Of course, as shown schematically in FIG. 1b, the means for control and driving 4 can be provided at a suitable distance from the vehicle 1 and, particularly in the case of application to survey and/or maintenance of installations such as water boxes of steam generators of nuclear power stations, the mentioned means 4 can, as will be described later in the description, be situated outside the steam generator, a connection by cable or by any connection device being ensured through a manhole designated TH in FIG. 1b.

In accordance with a particularly advantageous application of the apparatus for survey and/or treatment of a smooth curved surface according to the invention, the means 3 for survey and/or treatment fixed to the vehicle 1 comprise, in the case of treatment of the surface of a steam generator of a nuclear power station, and in particular the walls of the water box of this, an electropolishing cell, designated 30.

A more detailed description of an electropolishing cell particularly adapted to apparatus for treatment of surfaces according to the invention will now be given in connection with FIGS. 2a and 2b.

As appears in a schematic manner in FIG. 2a, an electropolishing cell designated 30 comprises, in accordance with an object of the invention, a suction cup formed with a substantially circular suction body 300. A permeable electrode designated 301, is situated inside the suction body 300, and delimits in this an electrolyte admission chamber designated 302 and an electrolyte suction chamber designated 303, when the suction body is applied onto the wall of the surface S to be treated. A fluid-tight joint designated 304 is arranged at the periphery of the suction body 300. An electrolyte contained in an electrolyte reservoir designated 40 circulates across the cathode 301 traversed by holes of small diameter, the assembly constituted by the suction body and the cathode being displaced along the wall, the fluid-tightness of the electropolishing cell being ensured by the mentioned fluid-tight joints 304.

As also appears in FIG. 2b, a set of small wheels 305 is fixed on the suction body 300, the wheels being intended to provide abutment of the suction cup with the surface S, in order to maintain constant the distance of the electrode 301 from the surface S to be treated.

Under the effect of reduced pressure induced by suction of the electrolyte, the fluid-tight joint 304 is normally squeezed. In order to control this squeezing, the mentioned set of wheels, constituted by polytetrafluoroethylene wheels, is rollingly mounted on ballbearings on pivot axes fixed in the suction body. This set of wheels has the function of ensuring and facilitating sliding of the suction cup on the surface S and obviates the phenomen of chatter which appears when the fluid-tight joint 304 is squeezed too much.

According to an advantageous characteristic of the electropolishing cell of the invention, the admission chamber 302 and the suction chamber 303 have respectively an admission tube 306 and a suction tube 307 for the already mentioned electrolyte. According to another particularly advantageous aspect of the electropolishing cell of the invention, the electropolishing suction cup is fixed to the vehicle 1 via an indexation table 308, mounted for movement in rotation with respect to an axis $\Delta$ perpendicular to the direction formed by the admission tube 306 and the suction tube 307 for the electrolyte. The indexation table 308 is provided with adjustment means 3080, permitting on displacement of the vehicle 1 maintenance of the plane containing the axis of admission and suction tubes for electrolyte, designated 306,307, substantially vertical. Of course, for a given path, the adjustment of orientation of the mentioned plane can also be adjusted once and for all. In particular when the smooth curved surface S is constituted by a spherical surface, the displacement path of the vehicle can be constituted by a great circle of the sphere for example, and the orientation of the said plane can be adjusted for a given path. The mentioned adjustment means 3080 can then be constituted by a system of knurled knobs permitting driving, in rotation with respect to the axis $\Delta$ the indexation table 308 on a predetermined orientation angle. Of course, the adjustment means 3080 can also be constituted by a stepper motor fixed to the indexation table and permitting displacement adjustment of this as a function of the path chosen.

According to another advantageous characteristic of the electropolishing cell according to the present invention, the suction body 300 is fixed to the indexation table 308, by the intermediary of a resilient suspension 309.

According to an advantageous embodiment of the mentioned resilient suspension, this comprises at least two spring jacks designated in FIG. 2b 3091,3092, of which the mandrel is fixed to the suction body 300 via a swivel pivot point, designated 310,311. The mentioned swivel pivot point 310,311 is mounted on two fixture lugs 3101,3111 fixed to the suction body 300 and arranged on a diameter of this. As will be noted particularly in FIG. 2b, each swivel 310,311 is slidingly mounted on the mentioned diameter. The spring jacks 3091,3092 are fixedly mounted on the indexation plate or table and are arranged in a manner that the force exerted by the springs of the jacks, or the plating force, ensure permanent contact of the suction cup with the wall to be treated. The mentioned jacks permit compensation of the variations of possible levels of the wall and allow reciprocal movement along the previously described axis $\Delta$. The connection of the jacks or the suction body 300 by the sliding swivels 310,311, permits the suction cup to take up any angular position, without introducing flexure stress in the rods of the jacks and in the fixture lugs 3101,3111 previously described. On mounting of the electropolishing suction cup on the vehicle according to the invention, two clips 3091,3092 permit ensuring the compression of these when the suction body and the suction cup are in a raised position.

Because the suction cup is rotated for angular corrections, it is advantageous to feed the electrode 301 with electric energy by a distributor system. This is advantageously mounted on the electrode rod and is designated 312. The distributor can advantageously comprise a brush system and can have an air circulation cooling system, permitting limitation of the heating of the distributor.

The suction body 300 can advantageously be constituted in a synthetic material such as PPH, hydrogenated polypropylene or PVDH, polyvinyl fluoride.

A more detailed description of a particularly advantageous embodiment of the vehicle 1 of the apparatus for survey and/or treatment of a smooth curved surface according to the present invention, will now be given in the case of a survey of a spherical surface, such as the water box of a steam generator of a nuclear power station, in connection with FIGS. 3a and 3b.

In accordance with the mentioned Figures, and in particular FIG. 3a, which shows a plan view of the vehicle 1, this comprises a central beam designated 100, serving to support the suction cup. As will be noted in FIG. 3b, the support shaft 2 is mechanically fixed to the central beam 100, by a swivel pivot point designated 20, arranged in the region of the centre of the mentioned central beam 100.

First hydraulic jacks, designated respectively 111,112, 113,114 are fixed to the central beam 100, by any suitable mechanical means. These mechanical means can be constituted advantageously by two centering guides locked by half-turn cams. The centering guides are respectively designated 130 in FIG. 3a and the half-turn cams are designated 140. The first hydraulic jacks designated 111,112,113,114 comprise a movable mandrel designated 1110,1120,1130,1140 in FIG. 3a, the mandrel of each mentioned first hydraulic jack being arranged in a first translation plane of the vehicle with respect to the surface S to be surveyed and/or treated. Thus, according to the first embodiment of FIG. 3a, the first mentioned jacks are arranged in a plane, which, on displacement of the vehicle 1, on the spherical surface S, is parallel to a plane tangent to the mentioned spherical surface S.

Further, as will appear more clearly in FIG. 3b, the vehicle 1 is provided with second hydraulic jacks designated 121,122,123,124, which are each fixed to the end of the mandrel 1110,1120,1130,1140 of a respective first hydraulic jack 111,112,113,114. It will be noted, however, that in FIG. 3a, there has been shown by way of simplification, only the system of first and second complete jacks relative to the first jacks 112 and 113, but it is of course evident that the vehicle 1, as will be further noted in FIGS. 1a and 1b, the movable end of the mandrel 1210,1220,1230,1240 of each of the second jacks is advantageously provided with a supporting suction cap designated 10,11,12,13 respectively, relative to the second jacks 122,123,124,121. The mentioned supporting cups 10,11,12,13 are able to be successively evacuated and pressurized, in accordance with a predetermined sequence, which in connection with the sequence of pressurization of the first and second jacks, permits the displacement of the vehicle 1 as will be described later in the description.

In accordance with another advantageous characteristic of the vehicle 1 shown in FIGS. 3a and 3b, the support arm 2 is a telescopic arm provided with a jack, permitting exertion on the vehicle 1 of a permanent pressure.

As clearly appears in FIG. 3b, the longitudinal axis of the second jacks 121,122,123,124 is inclined at an angle $\alpha$ with respect to the perpendicular at the longitudinal axis of the beam 100. It will be particularly noted that in FIGS. 3a and 3b the fixing of the second jacks to the first jacks, and in particular to the movable mandrel of these latter, can advantageously be provided by the intermediary of guide rails designated 1121,1131,1111 and 1141, and of slides designated 1122,1132,1142,1112, the fixing of the second jacks such as the jacks 122 and 123 for example, as shown in FIG. 3b, to the respective slides 1122,1132, can advantageously be provided by screwing or any other means. Further, and in a particularly advantageous manner, the longitudinal axis of the second jacks 121,122,123,124, the axis designated D13,D10,D11,D12, in accordance with FIG. 1a, and corresponding also to the axes of the abutment points previously mentioned, can be oriented in a manner to be inclined with respect to the perpendicular at the longitudinal axis of the central beam 100, and oriented towards the fixture point of the support arm 2, in the neighbourhood of the centre of curvature C of the said surface to be treated. Of course, in a non-limitative manner, the fixing of the second jacks 121,122,123,124 to the respective slides, can advantageously be carried out in a manner that the inclination $\alpha$ shown in FIG. 3b can be ajdusted by the operator. In this manner, it is possible to utilise the survey apparatus of the invention provided with the vehicle in its embodiment such as shown in FIG. 3b, for smooth surfaces with substantially different curvature.

Further, in an advantageous manner, as will be noted in FIG. 3a and FIG. 3b, the means for treatment and/or survey 3, and in particular the electropolishing cell 30 can advantageously be mounted movably on the vehicle 1, that is to say on the central beam 100. For this, the electropolishing suction cup 30 is mounted movably in translation on the face of the beam 100 opposite from that on which the support arm 2 is fixed. For this, the central beam 100 is a motorised beam, that is to say a beam provided with displacement means 5, a movable saddle 51 on which the electropolishing cell 30 is mounted via the previously described indexation table 308. By way of non-limitative example, the displacement means 5 can consist of a motor mounted at the end of the central beam 100, driving an endless screw, which permits displacement of the saddle 51.

A more detailed description of a supporting suction cup 10,11,12,13 mounted at the end of the movable mandrel of the second jacks will now be given in connection with FIG. 3c.

In accordance with the mentioned Figure, each supporting suction cup can advantageously comprise an application support designated 1000, of synthetic material, such as PVC for example, provided with a fluid-tight joint designated 1001, the fluid-tight joint being mounted at the periphery of the application support 1000 for rendering the suction cup adhesive by pressure reduction. The fluid-tight joints 1001 can advantageously be constituted in elastomeric material. A pressure reduction pipe 1002 opens into the cavity formed by the application support and the fluid-tight joints, designated respectively 1000 and 1001, the assembly being pivotingly mounted with the corresponding jack mandrel, via a swivel with an anti-rotation spigot designated 1003.

The vehicle 1 previously described in connection with FIGS. 3a and 3b is a carrying system ensuring the positioning and the displacement of the electropolishing suction cup in the spherical part of the water box of a steam generator.

In the working phase, the vehicle remains immovable and is fixed with respect to the wall of the water box by the supporting suction cups 10,11,12 previously described, whilst the electropolishing suction cup 30 is displaced along the length of the central beam 100 which carries it, thus ensuring the mentioned electropolishing function.

In the displacement phase, the electropolishing suction cup is at rest with respect to the vehicle 1. This latter, by being set in motion permits positioning of the electropolishing suction cup on a new zone to be submitted to the mentioned electropolishing treatment. The assembly of the vehicle and its equipment is dismountable in several distinct parts, of which the sizes permit their passage through manhole TH, of approximately 406 mm diameter. The mentioned parts can be assembled inside the water box by the operator.

A prototype of the apparatus for survey and/or treatment of a smooth curved surface according to the present invention has been produced.

In this prototype, the central beam 100 of the vehicle 1 has been provided with the help of a known motorised beam under the trade name of beams of the "Tollo M90" type of 800 mm length. On this beam, the possible stroke of the movable saddle was 500 mm. The jacks of the first type ensuring the movement in translation of the vehicle 1, jacks designated 111,112,113,114, of which the stroke of the mandrel was of the order of 50 mm and the jacks of the second type ensuring the support of the assembly of the vehicle and the movement of the support suction cups 10,11, 12,13 were jacks having a 40 mm stroke. The movable mandrels of the jacks of the second type fixed to the application support 1000 of each of the support suction cups 10,11,12,13 were fixed via a swivel 1003, with an anti-rotation spigot. This technical solution favours the positioning of each support suction cup on the wall S to be treated, and eliminates any stress on the rod of the jack which will unstick with significant inclination of the wall S.

The support arm 2 provided with a jack can in the case of application to treatment of the internal surface of the water box of a steam generator, be connected in the vicinity of the centre of curvature of the internal wall of the water box, and thus be fixed on the tubular plate, by a swivelling universal joint system. In the working phase, the jack of the support arm 2 is fed with air at a pressure of 2 bar. It thus ensures a constant pressure on the vehicle 1 in order to avoid its rocking. Its role is then that of a stabiliser. In the displacement phase, the constant pressure of the jack of the support arm 2 facilitates the application of the support suction cups 10,11,12,13 onto the wall S to be treated.

In the case of an emergency stop, a higher pressure, 6 bar for example, can be applied onto the vehicle 1 and immobilise this on the spherical wall. The support arm 2 then guarantees maintenance in position of the vehicle 1. A pressure of a comparable value can also be applied, in the case of an emergency stop, to the jacks of the second type 121,122,123,124.

In order to ensure the positioning at the beginning of survey and/or treatment of the apparatus according to the invention, there can be further provided in a non-limitative manner a guide rail designated 7, which can, in an advantageous manner, be mounted on the flat surface of the tubular plate of the water box of the steam generator, in this application. This guide rail 7 is shown in FIG. 1b. It can advantageously be formed of a circular rail, with a radius of curvature of 200 cm for example. Two wheeled saddles designated 70 and 71, are arranged on the mentioned rail and are fixed to the vehicle 1 by cables 700,710. The guide rail can be fixed by expansible plugs on the previously mentioned tubular plate. In operation, the saddles 70 and 71 follow the vehicle 1 in its displacement. The assembly of the guide rail 7, saddle 70, and saddle 71 thus facilitates manhandling of the vehicle of which the raising with respect to the sphere, that is to say the surface S to be treated, is made for example, by means of a pulley fixed to the rail 7. For safety, that is to say in the case of interruption of the reduction of pressure in the support suction cups, the rail 7 permits ensuring with the support arm 2, the positioning of the vehicle 1.

A more detailed description of the control sequence of the jacks of the first and second type, permitting ensuring the displacement of the vehicle 1 in the course of functioning of the apparatus for survey and/or treatment of a smooth, curved surface S, in accordance with the invention, will now be given in connection with FIGS. 4a to 4e.

The movement of the vehicle 1 is brought about by successive displacements corresponding to displacement of the mandrels of the jacks called first jacks 111,112,113,114. The movement can, of course, be made in two opposite directions, in a direction perpendicular to the longitudinal axis of the beam 100, these two directions being considered to constitute the advance and return of the vehicle.

The cycle of displacement of the vehicle 1 is carried out automatically. Each movement is controlled by pulses from members 4 previously mentioned in the description for control of displacement. One cycle can comprise, as will be described below in greater detail, successive displacements corresponding to the displacement of the mandrels of the jacks, called the first jacks 111,112,113,114.

In a general manner, the vehicle is held against the wall of the surface S to be treated, by the application of the support suction cups 10,11,12,13, held at reduced pressure. By operation of the first and second jacks, the suction cups are successively displaced, thus permitting progression of the vehicle.

The cycle of displacement corresponding to a pneumatic cycle for control of the jacks of the first and of the second jacks will now be described. FIG. 4a:

FIG. 4a corresponds to movement of the first support suction cup 10. This movement is carried out by, successively interruption of the pressure reduction of the support suction cup 10, and the pressurization of the jack 122, which lifts the mentioned support suction cup. The movement of the support suction cup 10 is symbolised by the arrow 1a and the jack 112 returns the assembly constituted by the jack 122 and the support suction cup 10, towards the beam 100, in accordance with the movement shown by the arrow 1b. The jack 122 then applies the support suction cup 10 onto the wall in accordance with the movement shown by the arrow 1c, and the support suction cup 10 is then again taken to reduced pressure.

FIG. 4b:

FIG. 4b relates to movement of the second support suction cup 11, these movements correspond to the previously described movements in connection with FIG. 4a, but relative, respectively, to the support suction cup 11, to the jack 123 and to the jack 113. The corresponding movements are designated 2a,2b,2c in FIG. 4b.

FIG. 4c:

FIG. 4c relates to movement of the central beam 100. In order to ensure the displacement of the central beam 100, the jacks 112 and 113 are extended simultaneously, then the jacks 111 and 114 are shortened simultaneously, these simultaneous movements bring about a displacement of the beam 100 equal to the stroke of the movable mandrels of the jacks 112,113,111 and 114.

FIG. 4d:

FIG. 4d shows the movement of the third support suction cup 13. The reduction of pressure in the support suction cup 13 is first of all released, then the jack 121 lifts the mentioned support suction cup. The jack 111 extends then the assembly constituted by the jack 121 and the support suction cup 13 of the central beam 100 then the jack 121 applies again the support suction cup 13 onto the wall of the surface S to be treated and this is again taken to reduced pressure. In FIG. 4d, the different movements are represented by the arrows designated 4a,4b,4c.

FIG. 4e:

FIG. 4e shows the movement of the fourth support suction cup 12. The movement of the fourth support suction cup 12 is of course identical to the movement of the third support suction cup 13, but, it is the jacks 124 and 114 which act. In FIG. 4e, the movements of the jacks 124 and 114 are shown by the arrows 5a,5b,5c.

Thus, by sequential control of the different jacks called the first and second jacks, the vehicle 1 can be displaced by an increment of displacement corresponding to the stroke of the jacks called the first jacks 111,112,113 and 114.

SECOND EMBODIMENT

Another embodiment of the apparatus for survey and/or treatment of a smooth curved surface, according to the present invention, will be described in the case of survey or treatment of a surface of very large radius of curvature or even substantially flat. This second embodiment can for example be advantageously used for the survey and/or treatment of the surface of the partition plate of the water box of a steam generator of a nuclear reactor.

In this case, it will be understood that the centre of curvature of the plate considered is practically projected to infinity. It is of course in these conditions advantageous to simplify the system previously described in connection with the first embodiment, in order to permit survey and/or treatment of a flat or substantially flat plate, or, as the case may be, a plate having a very large radius of curvature. This embodiment will be more particularly described in connection with FIGS. 5a and 5b, then with FIGS. 5c and 5d.

In accordance with the mentioned FIGS. 5a and 5b, the vehicle 1 advantageously comprises a beam 100 movable in rotation with respect to a centre of rotation designated CR in FIG. 5a, the centre of rotation CR then being situated in the region of the surface S to be treated. According to the second embodiment of the invention the means for abutment on the surface S have then an axis substantially perpendicular to this surface S. The support arm 2 of the vehicle is also fixed to this at one of its ends, and its other end is fixed to a fixed point of reference RF, the line AR formed by the centre of rotation CR of the vehicle 1 and the fixed point of reference RF being substantially orthogonal to the surface S. In accordance with the mentioned embodiment, the assembly constituted by the vehicle 1 and the support arm 2 is able, in operation, to be driven by operation control means 4, for a movement in rotation about the line AR, formed by the centre of rotation CR and the fixed point of reference RF, in a manner to permit a sectoral sweep of the surface S by the vehicle 1.

As will also appear in FIG. 5a, an electropolishing cell 30 is mounted on the vehicle 1, the electropolishing suction cup being mounted for movement in translation on the surface of the beam 100 opposite from that on which the support arm 2 is fixed.

Of course, in a manner analagous to the first embodiment according to the invention, the electropolishing cell 30 can advantageously be mounted on the vehicle 1, movably in translation, via the intermediary of a saddle 51 and of means for translational drive 5.

As further appears in FIG. 5a, the wheels of the set of wheels 305 of the body of the suction cup 300, then play the role of abutment means on the surface S, abutment means movable with respect to the body of the vehicle 1.

As will also be noted in FIG. 5b, the guide rail 7 is also mounted on the tube plate of the steam generator. The guide rail 7 can then advantageously be used in order to ensure guiding of the vehicle 1 in accordance with a sectoral sweep. The rail 7 then has a form substantially in the arc of a circle on which the vehicle 1 takes abutment and is slidingly mounted. The opening angle of the arc of the circle constituting the rail 7, corresponds of course to the maximum sectoral angle of sweep.

A more detailed description of the second embodiment shown in FIGS. 5a and 5b will now be given in connection with FIGS. 5c and 5d.

In FIG. 5c, there has been shown the vehicle 1, pivoted with respect to the centre of rotation CR, and provided with an electropolishing cell 30, such as previously described in connection with FIGS. 2a and 2b. Further, as will be noted in FIG. 5c, the vehicle 1 is driven in its movement of sectoral sweep by the intermediary of a reduction unit 8, installed on the beam 100, in the region of the guide rail 7.

The guide rail is for example a plate describing a semi-circle. This rail 7 is fixedly mounted with the aid of two axes on external blocks of the support of the vehicle. Further, as shown in FIG. 5d, two struts 9 ensure the parallelism of the guide rail 7 with respect to the partition plate. They also limit the torsion of the guide rail during the electropolishing phase. The struts 9 are fixed via a fixing plate on the tubular plate by means of expanding pegs for example. The struts 9 are fixed with the rail by two axes. An adjustment of the position of parallelism of the guide rail 7 with the tubular plate is possible thanks to the struts 9. In fact, they are constructed in accordance with the principle of a tensioner permitting the adjustment of the mentioned parallelism. A nylon rack is screwed onto the external face, with respect to the curvature of the rail 7. A reduction unit 8, fixed on the beam 100, and engaged with this rack permits operation of the movement of sectoral sweep of the beam 100 and of the vehicle 1.

The reduction unit 8 is driven in rotation by a motor, such as a DC motor supplied with 12 V for example, mounted on the beam 100. Two wheels fixed to the reduction unit 8 and two other wheels fixed to the beam 100 ensure the guiding of this with respect to the rail 7. Another wheel mounted on the beam and abutting on the inside of the rail permits maintaining a constant play between the motor pinion and the rack. It in effect enables the taking up of possible variations of the radius of the guide rail 7 causing a slight deformation when there is contact.

Two endless stroke relays positioned laterally on one side and the other of the beam, permit its stopping in raised position, that is to say substantially horizontal, and initiation of the reverse rotation of the reduction unit 8. They are connected for example to a counting system with an incremental counter situated in the displacement control means. The counter permits counting down of the number of passes made by the vehicle 1. Further, a commutator can permit the reversing of rotation of the reduction unit as necessary.

A more detailed description of the assembly of apparatus for survey and/or treatment of a smooth curved surface according to the invention, both as regards the first and the second embodiment, will now be given in connection with FIGS. 6a and 6b.

In accordance with the mentioned Figures, the means 4 for control and driving of the vehicle 1 can comprise, in the case particularly of use of an electropolishing cell 30, means 40 for feed of electrolyte to the electropolishing cell 30. Further, rectifier means 41 permit feeding with a direct voltage the electrode of the electropolishing cell 30. A logic block 42 for control delivers to the vehicle 1 control orders in the form of pneumatic logic control, via the intermediary of a pressure generator 43, which permits generation of control sequences in pneumatic logic in accordance with FIGS. 4a to 4e relative to the first and second jacks, or via the intermediary of an electric logic control block 44 permitting the delivery of the control sequences to the reduction unit 8 and to the displacement motor for the saddle 51.

A synoptic diagram of the control of an emergency stop of the apparatus for survey and/or treatment of a smooth curved surface, such as previously described in the different embodiments is shown in FIG. 6c.

In accordance with this Figure, the emergency stop controls the stopping of the advance of the electropolishing suction cup 30, the stopping of the pneumatic or electric cycle for displacement of the vehicle 1, stopping of the rectifier means 41, stopping of the pump for circulation of the electrolyte 40, with a temporary slowing down for emptying of the electropolishing suction cup 30, or the pressurization to high pressure of the jacks called the second jacks, and of the jack of the pressure arm of the first embodiment, in order to ensure arrest of the vehicle, arrest of the vehicle in the second embodiment being ensured via the reduction unit, which is irreversible and holds this in position.

There has thus been decribed an apparatus for survey and/or treatment of a smooth curved surface, particularly efficacious in the case where it is used for the survey of smooth surfaces, in which no intrinsic fixing means to the wall can be used.

The apparatus for survey and/or treatment of smooth curved surfaces according to the invention is remarkable in that, taking account of the embodiments described, this can be used, particularly in the case of an application for survey and/or maintenance of walls of the water box of a steam generator, for surfaces which are spherical and/or of very large radius of curvature or substantially flat. The modular conception of the constituent elements of the apparatus for survey and/or treatment of a smooth surface according to the invention permits use of this in the particularly delicate conditions of the electronuclear environment, and particularly for the accessability to the internal walls of water boxes of steam generators.

I claim:

1. Apparatus for survey and/or treatment of a smooth curved surface, said apparatus comprising:
    a vehicle able to be moved on said surface along a predetermined path,
    a body of said vehicle,
    means provided in said vehicle for abutment onto said surface, which means are movable with respect to said body of said vehicle,
    a support arm for said vehicle and fixed thereto at one of its ends, said arm being at its other end rotatably pivotable in the vicinity of a centre of curvature of said curved surface, axes of said abutment means and of said support arm being able to be oriented substantially concurrent in the vicinity of said centre of curvature of said curved surface,
    means for survey and/or treatment of said curved surface fixed to said vehicle,
    means for control and driving of said vehicle and of said means for survey and/or treatment.

2. Apparatus according to claim 1, wherein said means for survey and/or treatment fixed to said vehicle comprise an electropolishing cell in the case where said surface to be treated is a surface of a steam generator of a nuclear power station.

3. Apparatus according to claim 2, wherein said cell comprises:
    a suction cup having a substantially circular suction body,
    a permeable electrode situated in said suction body and delimiting in this, when said suction body is applied onto said surface to be treated, an electrolyte admission chamber and an electrolyte suction chamber,
    a fluid-tight joint arranged at a periphery of said suction body,
    a set of wheels fixed to said suction body, said wheels being intended to form abutment of said suction cup on said surface in order to maintain constant a distance of said electrode to said surface to be treated.

4. Apparatus according to claim 3, wherein said admission chamber and said suction chamber have respectively an admission tube and a suction tube for electrolyte, said suction cup being fixed to said vehicle via an indexation table mounted for rotational movement with respect to an axis (Δ) perpendicular to a direction formed by said admission tube and said suction tube, said table permitting in the course of displacement of said vehicle maintenance of a plane containing axes of said tubes substantially vertical.

5. Apparatus according to claim 4, including a resilient suspension fixing said suction body to said indexation table.

6. Apparatus according to claim 5, wherein said resilient suspension comprises:

at least two spring jacks, a mandrel of each said spring jack, a respective swivel pivot point for fixing each said mandrel to said suction body, a respective fixture lug fixed to the suction body and arranged on a diameter of this on which each swivel pivot point is mounted, each swivel pivot point being slidingly mounted on said diameter.

7. Apparatus according to claim 4, wherein said suction body is constituted of synthetic material suh as hydrogenated polypropylene or polyvinyl fluoride.

8. Apparatus according to claim 3, wherein in the case of survey of a spherical surface such as the water box of a steam generator of a nuclear power station, said vehicle comprises:
- a central beam serving to support said suction cup, said arm being mechanically fixed, by a swivel pivot point, to said beam in the region of the centre of this,
- first hydraulic jacks, each having a movable mandrel arranged in a first plane of translation of said vehicle with respect to said surface to be surveyed and/or treated,
- second hydraulic jacks each fixed to an end of said mandrel of a respective one of said first hydraulic jacks, an end of said movable mandrel of each of said second hydraulic jacks being provided with a support suction cup able to be successively taken to reduced pressure and pressurized.

9. Apparatus according to claim 8, wherein a longitudinal axis of said second jacks is inclined, each axis being thus oriented towards a fixture point of said arm in the vicinity of said centre of curvature of said surface.

10. Apparatus according to claim 8, wherein each said support suction cup comprises:
- an application support in synthetic material,
- a fluid-tight joint of elastomeric material, said fluid-tight joint being mounted on a periphery of said application support for forming an adhesive suction cup by reduction of pressure,
- a tube for reduction of pressure opening into a cavity formed by said application support and said fluid-tight joint for forming an adhesive suction cup by reduction of pressure,
- each said support suction cup being mounted for pivoting with a said mandrel of a corresponding one of said jacks via a swivel with an anti-rotation spigot.

11. Apparatus according to claim 8, wherein a guide rail is provided in order to ensure a sectoral sweep of said vehicle, said rail having a shape substantially in the arc of a circle along which said vehicle abuts said surface and is slidingly mounted, an opening angle of said arc of said circle constituting said rail corresponding to an angle of maximum sectoral sweep.

12. Apparatus according to claim 3, including an electropolishing cell mounted on said vehicle, said suction cup being translationally mounted on the face of said beam opposite from that to which said support arm is fixed.

13. Apparatus according to claim 12, wherein said cell comprises:
- a suction cup having a substantially circular suction body,
- a permeable electrode situated in said suction body and delimiting in this, when said suction body is applied onto said surface to be treated, an electrolyte admission chamber and an electrolyte suction chamber,
- a fluid-tight joint arranged at a periphery of said suction body,
- a set of wheels fixed to said suction body, said wheels being intended to form abutment of said suction cup on said surface in order to maintain constant a distance of said electrode to said surface to be treated,
- said wheels of said suction body having the role of means for abutment on said surface, movable with respect to said body of said vehicle.

14. Apparatus according to claim 12, wherein said beam is a motorised beam, that is to say it is provided with a saddle movable in translation along the beam, and displacement means for said saddle, said electropolishing cell being mounted on said saddle.

15. Apparatus according to claim 3, wherein said means for control and driving of said vehicle comprises:
- means for feed of electrolyte to said electropolishing cell,
- rectifier means permitting feed with direct voltage of said electrode of said electropolishing cell,
- a logic block for control delivery, to said vehicle, of control orders in the form of pneumatic or electric logic commands.

16. Apparatus according to claim 1, wherein said arm is a telescopic arm provided with a jack permitting exertion on said vehicle (1) of a permanent pressure.

17. Apparatus according to claim 1, wherein in case of survey of a surface having very large radius of curvature or a substantially flat surface, such as a partition plate of the water box of a steam generator, said vehicle consists of
- a beam movable in rotation with respect to a centre of rotation, situated in the vicinity of said surface,
- means for abutment on said surface having an axis substantially perpendicular to said substantially flat surface,
- said support arm of said vehicle, fixed to this at one of its ends, having its other end fixed to a reference point, a line formed by said centre of rotation and said reference point being substantially orthogonal to said surface,
- an assembly constituted by said vehicle and said support arm being able, functionally, to be driven by said driving control means for movement in rotation about said line formed by said centre of rotation and said fixed reference point in order to permit a sectoral sweep of said surface by said vehicle.

18. Apparatus according to claim 17, wherein said vehicle is driven by a reduction unit installed on said beam in the vicinity of said guide rail.

* * * * *